Jan. 12, 1926.  1,569,707
G. M. BUNNELL
DUMPING TRUCK
Filed March 29, 1922   3 Sheets-Sheet 1
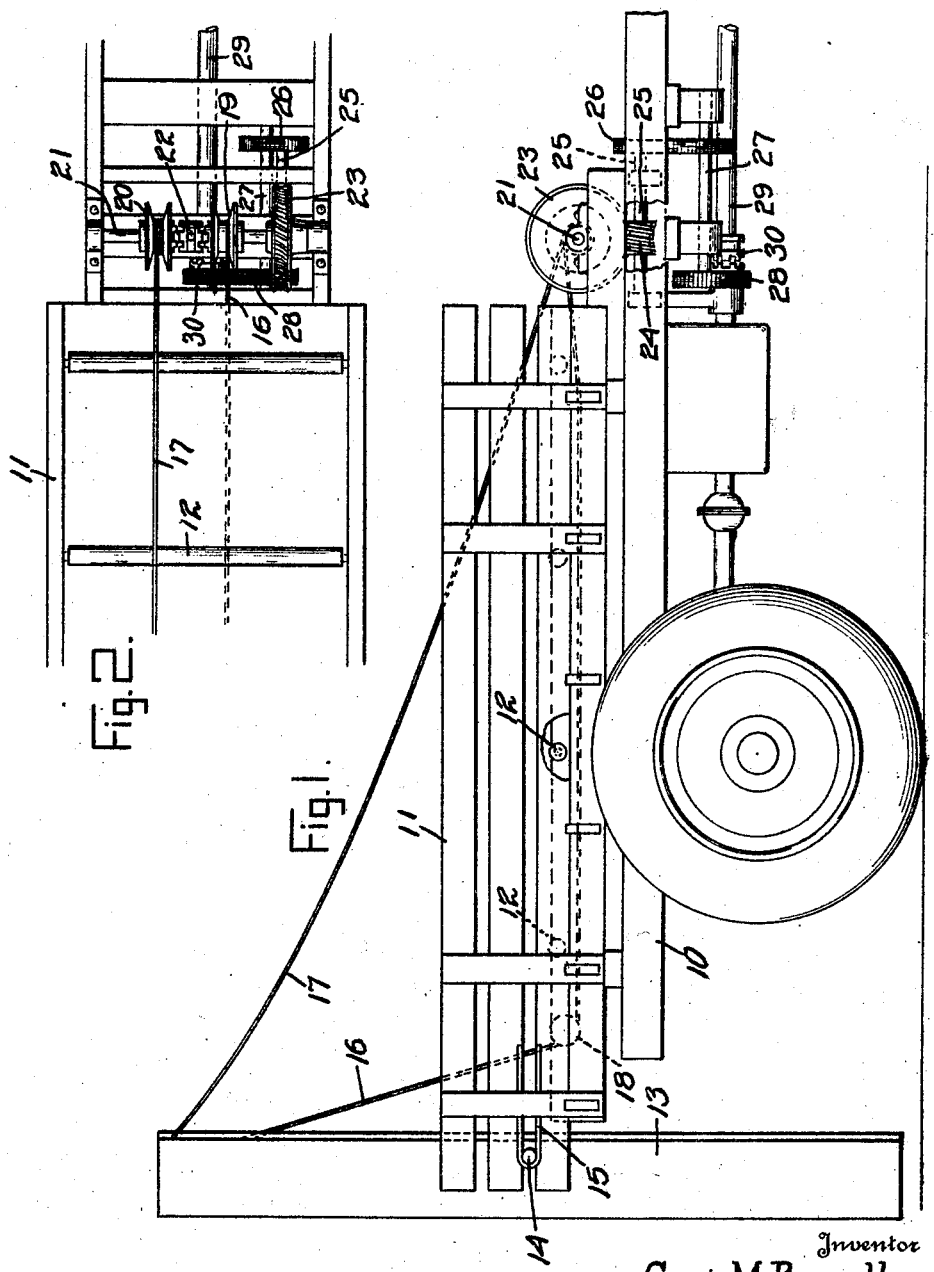
Inventor
Gussie M. Bunnell
By
Attorney

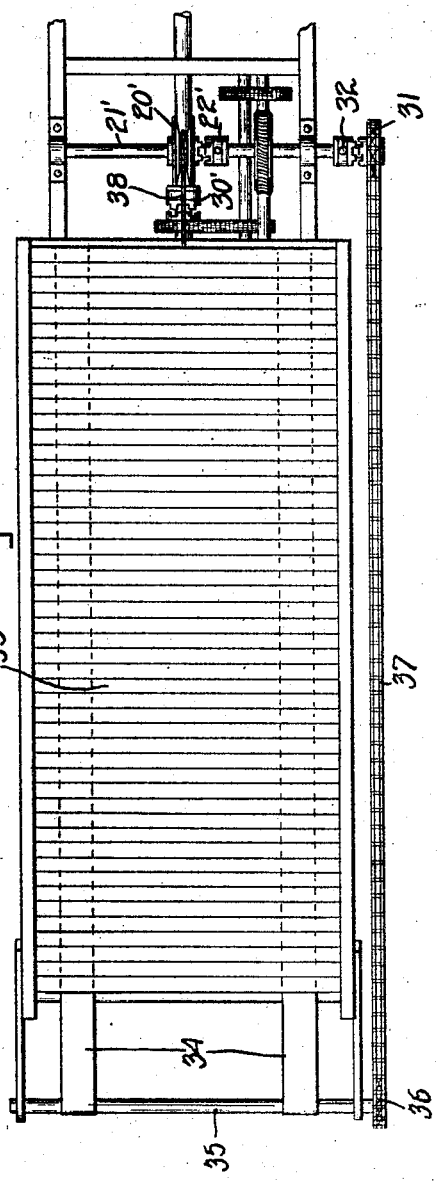
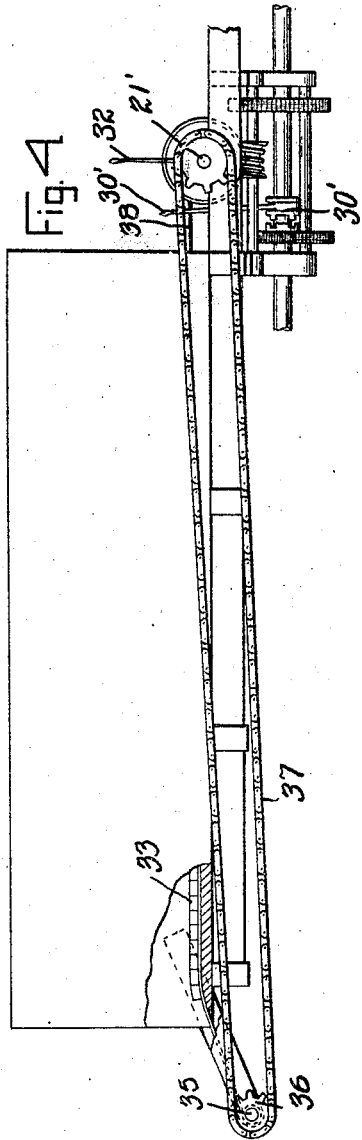

Jan. 12, 1926.
G. M. BUNNELL
1,569,707
DUMPING TRUCK
Filed March 29, 1922
3 Sheets-Sheet 3
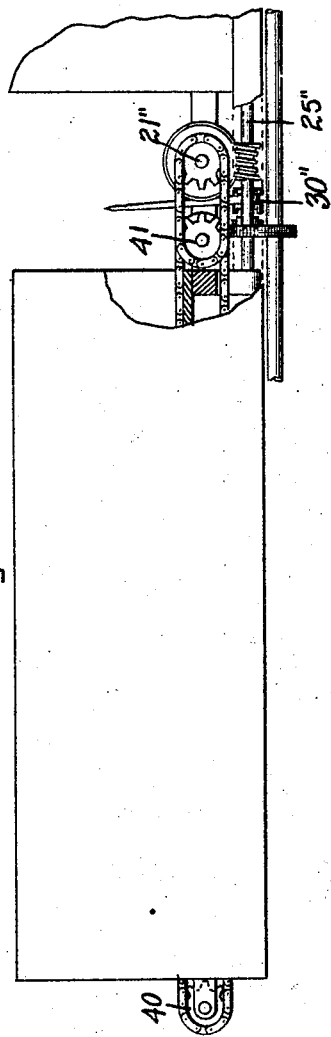
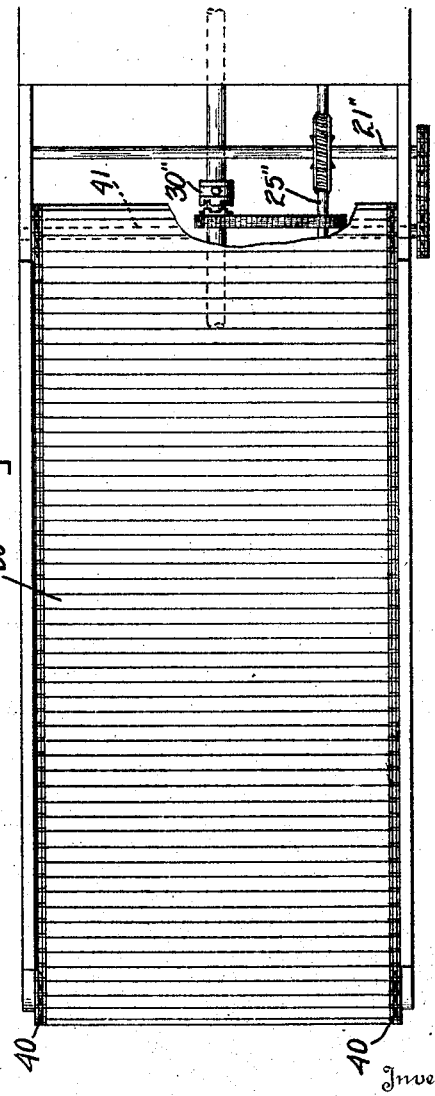
Inventor
Gussie M. Bunnell
By
Attorney Patented Jan. 12, 1926.

1,569,707

UNITED STATES PATENT OFFICE.

GUSSIE M. BUNNELL, OF MIAMI, FLORIDA.

DUMPING TRUCK.

Application filed March 29, 1922. Serial No. 547,793.

*To all whom it may concern:*

Be it known that I, GUSSIE M. BUNNELL, a citizen of the United States, residing at Miami, in the county of Dade and State of Florida, have invented certain new and useful Improvements in Dumping Trucks, of which the following is a specification.

My said invention relates to a truck having dumping means under the control of the operator and it is an object of the same to provide a device of the character described with means whereby the power of the engine may be utilized for the purpose of dumping the load.

A further object of the invention is to provide power-operated dumping means which shall be applicable to trucks of different types without material alteration.

Referring to the accompanying drawings which are made a part hereof and on which similar reference characters indicate similar parts.

Figure 1 is a side elevation of so much of a truck as is necessary to a disclosure of the present invention, Figure 2 is a fragmentary plan of certain parts shown in Figure 1, Figure 3 is a plan of a modified form, Figure 4 a side elevation of the same having parts of the body broken away to show the internal arrangement, Figure 5, a side elevation of another modification with parts broken away, and Figure 6 a plan of said modification.

In the drawings 10 indicates the body of a truck having side members 11 and having a floor provided with rollers 12. An inner body 13 is adapted to move on the rollers and is provided with trunnions 14 slidably mounted between two of the side members and limited as to their rearward movement by U-shaped metallic members 15 fixed to said side members at the rear end thereof. In Figure 1 this auxiliary body is shown in dumping position.

For moving it from dumping position to loading position and vice versa, a pair of cables 16 and 17 are attached to the upper or forward end of the inner body at one end. The cable 16 passes under a guide pulley 18 and beneath the rollers 12 to the forward part of a truck where it is secured to and adapted to be wound on a spool 19. Cable 17 passes directly forward to a similar spool 20. These spools are located on a transverse shaft 21 having splined thereto a reversing clutch member 22. This reversing clutch member has teeth at each end adapted to engage corresponding teeth on one or the other of said spools 19 and 20.

A worm wheel 23 is secured to shaft 21 adjacent one end thereof and this worm wheel is driven by a worm 24 on a longitudinal shaft 25. The latter shaft is geared by a silent chain or like device 26 to a shaft 27 which is similarly geared at 28 to an engine shaft 29 which may be a jack-shaft or may be the main shaft in trucks having the transmission gearing at the rear end of the main shaft. A clutch member 30 splined on the engine shaft serves to connect the shaft to the dumping mechanism or disconnect it therefrom as desired.

In the modification shown in Figures 3 and 4 the operating mechanism is substantially identical with that heretofore described, save that the shaft 21' carries only a single spool 20' and has at one end a sprocket 31 adapted to be clutched to the shaft by means of a member 32. The load-sustaining device of the truck in this instance consists of a series of slats 33 secured to flexible bands 34 which are adapted to be wound on a shaft or drum 35 at the rear end of the truck. This shaft or drum is driven by a sprocket 36 connected by means of a sprocket chain 37 to sprocket 31. As the load-supporting device 33 is wound on shaft 35 the load is dumped at the rear of the truck, being carried bodily backward by the supporting means. At the forward end of the flexible load-support a cable 38 is secured thereto which is also secured to spool 20' and adapted to be wound thereabout. As the load is dumped the cable unwinds from the spool 20', the clutches at 30, and 32 being closed to drive the sprocket gearing for this purpose and after the load has been dumped the clutch 32 is thrown out and clutch 22' is thrown in, to drive the spool 20' and wind up the cable which draws the load-support back to the position shown in Figure 3.

In the modifications shown in Figures 5 and 6 the load-support comprises an endless floor on the order of a belt conveyor, this floor having cross slats 39 secured to sprocket chains 40 at the sides. To unload the truck the sprocket chain is set in motion by mechanism comprising an engine shaft having a clutch 30″, the engine shaft driving a worm shaft 25″ through a silent chain or the like. Shaft 25″ drives a transverse shaft 21″ by means of worm gearing and the latter shaft is connected by sprocket gearing to another transverse shaft 41 which carries spaced gears over which pass the sprocket chains of the load-sustaining device.

The devices above described serve to illustrate different embodiments of the principle of my invention as applied to trucks of different types. It will be obvious, however, to those skilled in the art that numerous other changes may be made in the device of my invention for the purpose of applying the same to other types of trucks or for other purposes all without departing from the spirit of my invention, the true scope of which is indicated in the appended claim.

Having thus fully described my said invention, what I claim as new and desire to secure by Letters Patent, is:—

A truck having a body and an engine shaft, side members comprising spaced horizontally disposed slats carried by said body, a U-shaped member between the bottom pair of slats of each side member adjacent its rear end, the inner faces of the U-shaped member being flush with the respective slats, an inner body adapted to slide longitudinally of said truck body and adapted to tilt at the conclusion of its rearwardly sliding movement said inner body having a trunnion at each side disposed between the bottom pair of slats and adapted to engage the curved portion of the U-shaped member to limit the rearward movement of the inner body, a transverse shaft at the forward end of the truck, means connecting said shaft in driving relation with the engine shaft, a pair of spools loosely mounted on the transverse shaft, a single clutch member between the spools and splined to the shaft whereby either spool may be driven by the transverse shaft, a pair of cables connected to the forward end of said inner body and adapted to be wound upon said spools for dumping the said inner body and restoring the same to its original position, substantially as set forth.

In witness whereof, I have hereunto set my hand and seal at Washington, District of Columbia, this 28th day of March, A. D. nineteen hundred and twenty-two.

GUSSIE M. BUNNELL. [L. S.]